United States Patent [19]

Garner

[11] Patent Number: 4,609,729

[45] Date of Patent: Sep. 2, 1986

[54] ORGANOSOLUBLE $C_3$–$C_4$ HYDROXYALKYL ETHYL CELLULOSE ETHERS

[75] Inventor: Joseph L. Garner, Sanford, Mich.

[73] Assignee: The Dow Chemical Company, Midland, Mich.

[21] Appl. No.: 719,183

[22] Filed: Apr. 3, 1985

[51] Int. Cl.[4] .................................... C08B 11/193
[52] U.S. Cl. ................................. 536/91; 106/191
[58] Field of Search ........................ 536/91; 106/191

[56] References Cited

U.S. PATENT DOCUMENTS

| | | | |
|---|---|---|---|
| 3,712,886 | 1/1973 | Koyanagi et al. | 106/191 |
| 3,870,702 | 3/1975 | Koyanagi et al. | 106/191 |
| 3,873,518 | 3/1975 | Strange et al. | 536/91 |
| 4,091,205 | 5/1978 | Onda et al. | 536/91 |
| 4,429,120 | 1/1984 | Dehnke | 536/91 |
| 4,477,657 | 10/1984 | Strange et al. | 536/91 |

FOREIGN PATENT DOCUMENTS

| | | | |
|---|---|---|---|
| 59-49201 | 3/1984 | Japan | 536/91 |
| 812510 | 4/1959 | United Kingdom | 536/91 |

*Primary Examiner*—Ronald W. Griffin

[57] ABSTRACT

$C_3$–$C_4$ hydroxyalkyl ethylcellulose ethers are substantially soluble in toluene, and toluene and heptane mixtures. Such organo-soluble cellulose ethers are useful in thickening organic solvent systems comprised of toluene.

13 Claims, No Drawings

ORGANOSOLUBLE $C_3-C_4$ HYDROXYALKYL ETHYL CELLULOSE ETHERS

BACKGROUND OF THE INVENTION

This invention relates to organo-soluble cellulose ethers, and in particular to hydroxyalkoxyl substituted ethylcellulose ethers.

Common commercially available cellulose ethers such as methylcellulose, hydroxyethyl methylcellulose, hydroxypropyl methylcellulose, hydroxypropylcellulose and the like are employed as thickeners, protective colloids, film formers and for other uses in aqueous systems. While these cellulose ethers are useful in aqueous systems, the water-soluble ethers are generally insoluble in organic solvents and nonthermoplastics. Accordingly, these cellulose ethers cannot be employed in organic systems. For example, it is difficult to employ such cellulose ethers as additives in organic solvent systems, such as inks and the like.

To meet the need for a cellulose ether with organic solubility, more hydrophobic cellulose derivatives have been developed. Such compositions include ethylcellulose, ethylhydroxypropyl methylcellulose and ethylhydroxyethylcellulose have been developed. While these cellulose ethers are both organo-soluble and thermoplastic, they have other deficiencies which significantly limit their utility. For example, most ethylcellulose ethers are insoluble in nonpolar organic solvents, such as the hydrocarbons and their halo, nitro, and cyano substituted derivatives which have low solubility parameters. Generally, if solubility in such nonpolar solvents is required, the ethylcellulose must be substantially completely substituted, i.e., have an ethoxyl degree of substitution of about 3. Unfortunately, ethylcellulose with a degree of substitution greater than about 2.5 exhibits a tendency to crystallize, which renders the cellulose ether insoluble in most solvents.

Still another disadvantage of known technology involves the fact that the preparations of ethylhydroxyethylcellulose and ethylhydroxypropyl methylcellulose are not particularly efficient nor effective. The ethylene oxide commonly used in the preparation of ethylhydroxyethylcellulose can react with water, ethyl chloride and other reagents present in the reaction mixture. Consequently, the overall yield of the process is greatly reduced and a variety of by-products are formed which are difficult to remove from the product.

Accordingly, a cellulose ether which is soluble in nonpolar organic solvents and is efficiently and effectively prepared would be highly desirable.

SUMMARY OF THE INVENTION

This invention is a $C_3-C_4$ hydroxyalkyl ethylcellulose ether which is substantially soluble at ambient temperatures in toluene.

In another aspect, this invention is a process for preparing $C_3-C_4$ hydroxyalkyl ethylcellulose ethers. The process comprises contacting an amount of alkalicellulose with a functionally effective amount of a $C_3-C_4$ alkylene oxide and a functionally effective amount of an ethyl halide under reaction conditions such that a $C_3-C_4$ hydroxyalkyl ethylcellulose is prepared which is substantially soluble at ambient temperatures in toluene.

Surprisingly, this invention provides cellulose ether compositions which are soluble in nonpolar organic solvents and which are efficiently and effectively prepared. The cellulose ethers of the invention are useful in thickening ink formulations such as those comprised of nonhydrogen bonded organic solvent systems.

By the term "ambient temperatures" is meant that temperature at which the solution of polymer in solvent is employed. Typically, the temperature is room temperature (i.e., about 15° C. to about 30° C.) at atmospheric pressure.

DETAILED DESCRIPTION OF THE INVENTION

As used herein, the organo-soluble cellulose ethers of the invention are those cellulose ethers which form thermodynamically stable mixtures with toluene and toluene and nonhydrogen bonded organic solvent mixtures at ambient temperatures. Such mixtures form spontaneously and include the solutions in which individual cellulose ether molecules are dispersed in the organic solvent as well as micellular or colloidal solutions wherein the polymer molecules are aggregated to some extent, but wherein such aggregates are no larger than colloidal size. When employed as thickeners in ink compositions, true solutions are preferred, because interference with the dying properties of the ink are avoided.

A cellulose ether is substantially soluble in organic solvents when a substantial amount of the ether can form such thermodynamically stable mixtures in such solvents at ambient temperatures. Preferably, such ethers are infinitely soluble in such solvents, and will form true solutions up to about a 10 weight percent solution, or up to the point where a highly viscous gel forms as determined by physical observation.

The cellulose ethers of this invention are derivatives of cellulose. Cellulose is a long-chain molecule comprised of repeating anhydroglucose units. Such units have three hydroxyl sites available for etherification. When etherified, the cellulose ether is defined in terms of the extent to which the etherifying groups have substituted for the hydroxyl groups on the anhydroglucose units. When a hydroxyalkoxyl group is an etherifying agent, the extent of substitution is described as molar substitution; i.e., the average number of moles of the hydroxyalkoxyl group substituted on the anhydroglucose unit. In view of the fact that each hydroxyalkoxyl group provides an additional hydroxyl group for substitution, there is theoretically no limit to the amount of hydroxyalkoxyl substitution. When an alkoxyl group is an etherifying agent, the extent of substitution is described as the degree of substitution; i.e., the average number of hydroxyl groups substituted with alkoxyl groups. Such groups can substitute for the hydroxyls on the anhydroglucose backbone, and the pendant hydroxyls on the hydroxyalkoxyl group. Therefore, the alkoxyl degree of substitution can theoretically range from 0 to 3.

The C$_3$–C$_4$ hydroxyalkyl ethylcellulose ethers of this invention have sufficient ethoxyl substitution to render the ether organo-soluble. Generally, as the ethoxyl substitution increases, the ether becomes soluble in organic solvents which are less polar, and more poorly hydrogen bonded, for example toluene. The range of ethoxyl degree of substitution can vary from about 2.4 to about 2.7, although any ethoxyl degree of substitution which can render the ether substantially soluble in toluene is sufficient. Also, it is desirable that the amount of ethoxyl employed is sufficient to cap the pendant hydroxyls on the hydroxyalkoxyl chains.

The amount of C$_3$–C$_4$ hydroxyalkoxyl groups on the ethylcellulose ether is sufficient to stabilize the ethylcellulose. By "stabilize" is meant that the tendency of the highly ethoxylated cellulose ether to crystallize is inhibited. Such crystallization can be visually observed, can occur spontaneously and provides undesirable insolubility in most solvents. Therefore, such a tendency can be readily determined and avoided. The upper limit on the amount of the C$_3$–C$_4$ hydroxyalkoxyl substitution is that amount which inhibits the ethyl cellulose ether's solubility in the desired organic solvents. The C$_3$–C$_4$ hydroxyalkoxyl molar substitution can vary from about 0.38 to about 0.63, although any effectively stabilizing amount is sufficient.

Preferably, the substitution of the ethoxyl and C$_3$–C$_4$ hydroxyalkoxyl groups on the anhydroglucose units are substantially uniform, i.e. that each anhydroglucose unit has substantially similar type and amount of substitution. For example, in view of the fact that when a hydroxyalkoxyl group substitutes on the unit a new hydroxyl group is provided for substitution, one anhydroglucose unit can have the entire hydroxyalkoxyl molar substitution. However, since the molar substitution value refers to the average substitution, such a substituted polymer can have the same molar substitution value as a polymer having small substitution on each anhydroglucose unit.

The organic-soluble cellulose ethers of this invention can be prepared by reacting alkali cellulose with an ethyl halide and a C$_3$–C$_4$ alkylene oxide (propylene or butylene oxide) under suitable reaction conditions. Typically such conditions can include subjecting the reaction mixture to high temperatures, in an inert atmosphere, at super-atmospheric pressures and performing the reaction in the presence of an inert diluent.

Alkali cellulose is advantageously prepared by reacting cellulose pulp with a functionally effective amount of an alkali metal hydroxide. The alkali metal hydroxide functions to break up the crystalline structure of the cellulose, catalyze the etherifying agent cellulose reaction and react with the cellulose and etherifying agent to attach ether groups to the cellulose. The alkali metal hydroxide is generally employed as an aqueous solution containing about 50 weight percent or more, preferably about 73 weight percent of the alkali metal hydroxide. Typically, caustic is employed as the alkali metal hydroxide because of economic considerations. Advantageously, about 1.1 parts by weight of cellulose pulp of caustic is employed, although any amount which can perform the functions is sufficient.

Preferably, to obtain a substantially uniformly substituted cellulose ether, two charges of the alkali metal hydroxide are added. In addition to the initial charge of caustic, a functionally effective amount can be added after the etherifying agents have been added. Such second charge of caustic preferably is of a greater amount and strength than the initial charge. For example, about 2.5 parts by weight of cellulose of about a 100 percent concentrated bead caustic is suitable for the second charge.

Preferably, the cellulose ether of the invention is prepared in a slurry in an inert organic diluent such as, for example, benzene, toluene, or methyl ethyl ketone. In such a process, the alkalization and C$_3$–C$_4$ hydroxyalkoxyl substitution is performed substantially simultaneously; i.e., functionally effective amounts of the alkali metal hydroxide, cellulose pulp, C$_3$–C$_4$ alkylene oxide and organic diluent are charged to the reaction vessel simultaneously. A suitable amount of the C$_3$–C$_4$ alkylene oxide can vary from about 0.4 to about 1, preferably about 0.6 parts by weight of cellulose pulp, and a suitable amount of the diluent is about 11.6 parts by weight of cellulose pulp.

The reaction slurry is subjected to reaction conditions, comprising a functionally effective time and temperature. Thereafter, a functionally effective amount of an ethyl halide is charged to the vessel. A suitable amount can vary from about 2.3 to 5, preferably about 3.5 parts by weight of cellulose pulp. The reaction slurry thus comprising the ethyl halide is subjected to effective reaction conditions. To complete the etherification, the second charge of caustic is charged to the vessel, and subjected to effective reaction conditions. The reaction product can then be prepared for commercial utilization according to conventional means.

The organic solvents in which the cellulose ethers can be soluble are, for example, mixtures of toluene and nonhydrogen bonded organic solvents which exhibit a solubility parameter of 7.8 [cal/cm$^3$]$^{\frac{1}{2}}$ or greater. Such solvents include those solvents described in E. H. Immergut, *Polymer Handbook*, 2d ed., 1975, as poorly hydrogen bonded solvents in the section discussing solubility parameters. For example, hydrocarbons and their halo-, nitro- and cyano substitution products are such poorly hydrogen bonded solvents. The cellulose ethers of the invention can also be soluble in mixtures of toluene and the constituents of petroleum which have distillation temperatures above about 60° C. Another species of suitable solvents are Lactol Spirits ® (trademark of American Mineral Spirits Company) which can be comprised of about 40 percent toluene and 60 percent aliphatic hydrocarbon solvents, primarily heptane. The cellulose ethers of the invention can form true solutions at ambient temperatures in a 100 percent toluene solution, as well as in a 20 percent toluene and 80 percent heptane solution. The solubility parameter of the 20/80 solution, as determined by a weighted average of the solvent's cohesive energy densities is 7.8 [cal/cm$^3$]$^{\frac{1}{2}}$, while the solubility parameter of 100 percent toluene is 8.9 $[cal/cm^3]^{\frac{1}{2}}$.

The viscosity of the organo-soluble cellulose ethers can vary from about 4 to greater than 1000 cps measured as a 5 percent solution in an 80 percent toluene and 20 percent ethanol solvent at 23° C.

The cellulose ethers of this invention exhibit a higher viscosity effect in organic solvents compared with ethylhydroxyethylcellulose. For example, to obtain a substantially similar thickening effect, less of the cellulose ether of this invention can be employed than the amount of ethylhydroxyethylcellulose; e.g., about 0.75 to 1. The cellulose ethers of this invention provide similar quality compared with a system employing ethylhydroxyethylcellulose when tested in the let down, metal resinate, and gloss tests employed by the printing industry when evaluating ink compositions.

The following examples are intended to illustrate the invention but not to limit the scope. All parts and percentages are by weight unless otherwise indicated.

EXAMPLE 1

Sample No. 1 is prepared by charging a 2-liter PARR reactor with 72 grams (g) of cellulose pulp (Buckeye E-7 ground through a ½ mm screen) and 785 g of toluene as a diluent. Using a loop agitator, this mixture is agitated at 1100 rpm, heated to about 90° C., and contacted with 109.5 g of a 73 percent molten sodium hydroxide solution. Contact time is five minutes. The reactor is closed, the air evacuated, and purged with nitrogen. A 93.2 g charge of a 46.4 percent propylene oxide in toluene solution and a 252 g charge of ethyl chloride are added to the reactor. The reaction temperature is maintained at 90° C. at a 180 rpm agitation rate for one hour. The reaction temperature is then raised to 130° C., and proceeds for two hours. To the heated reaction mixture is added 180 g of 100 percent bead sodium hydroxide, the reaction temperature is raised to 140° C., and proceeds for seven hours. The product dump mass is granulated by contacting with boiling water to evaporate the organic solvents, and to solubilize the remaining by-product salts and caustic. The product is water washed and hot air dried. The product has a hydroxypropoxyl molar substitution of 0.47 and an ethoxyl degree of substitution of 2.6. A one weight percent portion of this cellulose ether is soluble in a Lactol Spirits ® composition, and the solution has a viscosity at 23° C. of 21.6 cps.

A one weight percent portion of this cellulose ether forms a true solution with a 100 percent toluene solution.

A one weight percent portion of this cellulose ether forms a true solution with a 20 percent toluene and 80 percent heptane solution.

EXAMPLE 2

Sample No. 2 is prepared in the same manner as Sample No. 1, except 0.6 parts based on weight of cellulose pulp of butylene oxide is used rather than propylene oxide. The cellulose ether has a hydroxybutoxyl molar substitution of 0.42 and an ethoxyl degree of substitution of 2.7. The cellulose ether is soluble in Lactol Spirits ®, yielding a hazy solution. A one weight percent portion in Lactol Spirits ® has a viscosity at 23° C. of 16.7 cps.

What is claimed is:

1. A $C_3-C_4$ hydroxyalkylethylcellulose ether which is substantially soluble at ambient temperatures in toluene.

2. The cellulose ether of claim 1 characterized as having a $C_3-C_4$ hydroxyalkoxyl molar substitution from about 0.38 to about 0.63, and an ethoxyl degree of substitution from about 2.4 to about 2.7.

3. The cellulose ether of claim 2, wherein the hydroxyalkoxyl group is hydroxypropoxyl.

4. The cellulose ether of claim 3 characterized as having a hydroxypropoxyl molar substitution of about 0.42, and an ethoxyl substitution of about 2.6.

5. The cellulose ether of claim 1, wherein said cellulose ether forms a solution with an organic solvent having a solubility parameter of greater than about 7.8 $[cal/cm^3]^{\frac{1}{2}}$.

6. The cellulose ether of claim 5 wherein said solvent comprises about 20 percent toluene and about 80 percent heptane.

7. The cellulose ether of claim 6, wherein said cellulose ether forms a solution with said organic solvent in which cellulose ether is present at about a 1 weight percent concentration.

8. A process for preparing organic-soluble $C_3-C_4$ hydroxyalkyl ethylcellulose ethers, said process comprising (a) contacting an amount of alkali cellulose with an amount of a $C_3-C_4$ alkylene oxide, and an amount of an ethyl halide under reaction conditions, such that a $C_3-C_4$ hydroxyalkyl ethylcellulose is prepared which is substantially soluble at ambient temperatures in toluene.

9. The process of claim 8, wherein the $C_3-C_4$ alkylene oxide is propylene oxide, and the ethyl halide is ethyl chloride.

10. The process of claim 8 wherein said $C_3-C_4$ hydroxyalkyl ethylcellulose reaction product is characterized as having a $C_3-C_4$ hydroxyalkoxyl molar substitution of about 0.38 to about 0.63, and an ethoxyl degree of substitution of about 2.4 to about 2.7.

11. The process of claim 10 wherein the alkali cellulose is prepared by reacting cellulose pulp with a functionally effective amount of a 73 weight percent alkali metal hydroxide aqueous solution.

12. The process of claim 11, wherein the alkali metal hydroxide solution is caustic.

13. The process of claim 8, wherein the $C_3-C_4$ alkylene oxide is butylene oxide, and the ethyl halide is ethyl chloride.

* * * * *